June 3, 1941.  G. A. LYON  2,244,014
WHEEL COVER MEMBER AND ASSEMBLY
Filed Oct. 6, 1939
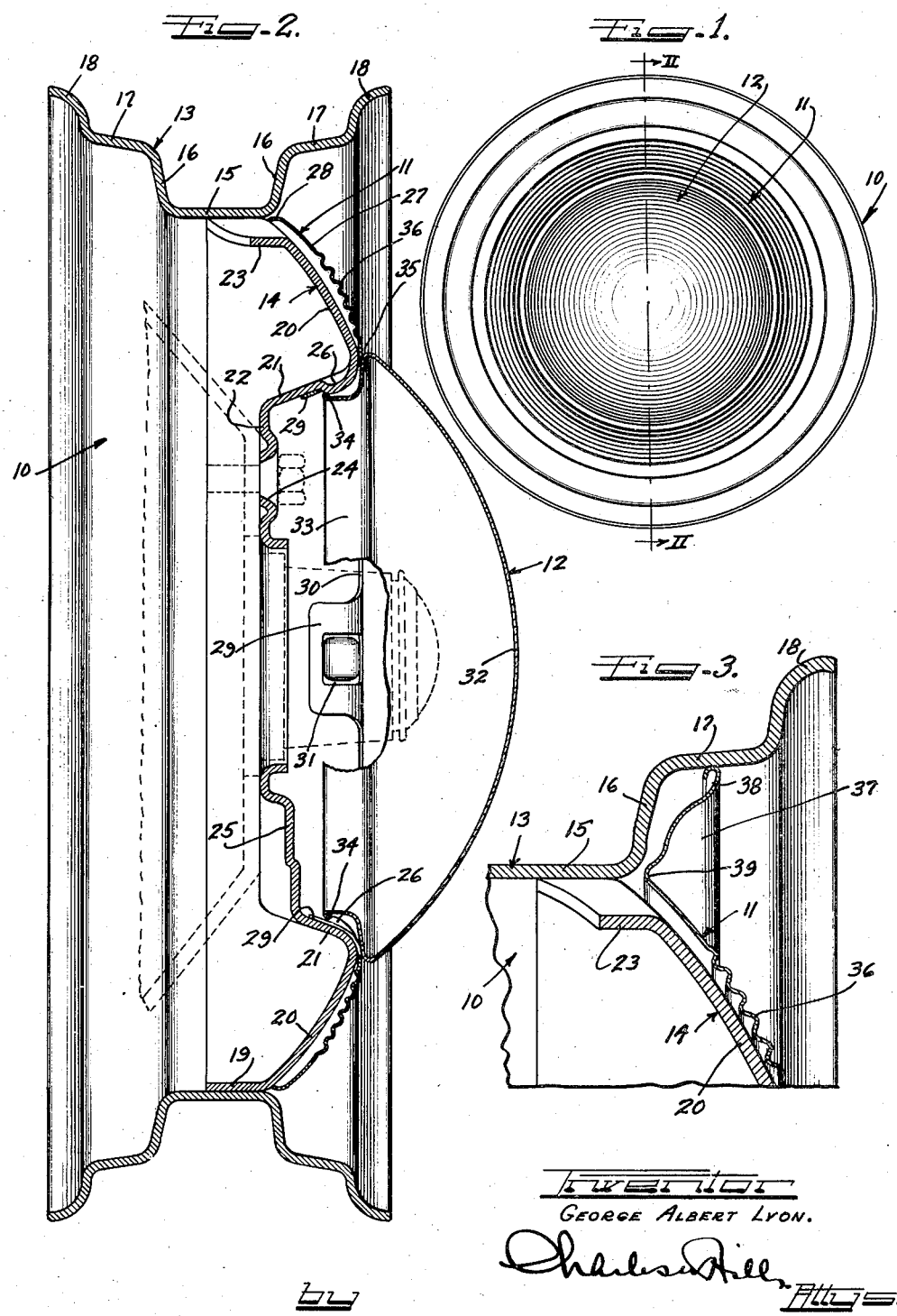
Inventor
GEORGE ALBERT LYON.

Patented June 3, 1941

2,244,014

UNITED STATES PATENT OFFICE 2,244,014

WHEEL COVER MEMBER AND ASSEMBLY

George Albert Lyon, Allenhurst, N. J.

Application October 6, 1939, Serial No. 298,217

8 Claims. (Cl. 301—37)

This invention relates to a novel wheel assembly and to novel ornamental members to be employed on the outer face of a vehicle wheel.

More particularly, this invention relates to a novel assembly of ornamental wheel cover members on a vehicle wheel in which no individual spring fingers are employed for securing the wheel cover members to the wheel such as is the common practice of the present day. In the particular embodiment of the present invention which is illustrated and described herein, an annular ornamental cover member has a portion thereof sprung over a plurality of protuberances or projections on an axially extending shoulder of a vehicle wheel, the protuberances or projections being permitted to extend through suitable openings in the member. A second wheel cover member or hub cap is provided with an axially rearwardly projecting flange portion which is sprung over the same protuberances or projections which secure the first member to the wheel. Both members are held in firm engagement with the vehicle wheel by virtue of their own inherent resiliency.

It is an object of the present invention to provide a novel vehicle wheel assembly.

Another object of the present invention is to provide a novel vehicle wheel assembly including a vehicle wheel having at least two cover members mounted thereon in a novel manner.

A further object of the present invention is to provide a vehicle wheel having inwardly projecting protuberances formed on an outer face thereof and having flange portions of at least two cover members sprung over these protuberances, at least one of the cover members having openings therein through which the protuberances project whereby all cover members make direct retaining contact with the protuberances.

Another object of the present invention is to provide a novel method and means for securing an ornamental member or other thin metal member to a vehicle wheel.

The novel features which I believe to be characteristic of the present invention are set forth with particularity in the appended claims. My invention itself, however, both as to its organization and manner of construction and method of assembly, together with further objects and advantages thereof, may best be understood by reference to the following description, taken in connection with the accompanying drawing, in which:

Figure 1 is a front view of a vehicle wheel equipped with a pair of ornamental members in accordance with the teachings of the present invention;

Figure 2 is an enlarged cross-sectional elevational view taken along the line II—II of Figure 1;

Figure 3 is an enlarged fragmentary sectional view illustrating a second embodiment of the present invention.

Referring now to the first embodiment of my invention which is illustrated in Figures 1 and 2 of the drawing, there is shown therein a wheel assembly comprising a vehicle wheel 10 and two wheel cover members 11 and 12. The wheel 10 comprises a rim part 13 and a body part 14. The rim 13 is of the usual drop center type and includes a base flange 15, opposite intermediate side flanges 16, opposite intermediate base flanges 17, and opposite edge portions 18. The drop center rim 13 is illustrated as of the type which is commonly employed in the automotive vehicle art of the present day, and, as is well known to those skilled in the art, is arranged to receive and accommodate a pneumatic tire (not shown).

The body part 14 of the wheel 10 includes, in general, a rearwardly extending outer flange 19, an outer web portion or nave 20, a generally axially rearwardly slightly radially inwardly extending flange or shoulder portion 21, and a radially inwardly extending wheel mounting flange 22. The rearwardly extending outer flange 19 is secured to the under side of the base flange 15 of the rim 13 in any suitable manner, such as by riveting, welding or the like. Circumferentially spaced portions of the rearwardly extending outer flange 19 are depressed radially inwardly as at 23.

The wheel mounting flange 22 is provided with an annular series of apertures 24 for the reception of the usual wheel mounting bolt (not shown) which extend therethrough into engagement with the wheel supporting element (not shown) of the vehicle. Circumferentially spaced portions of the flange 22 are pressed axially outwardly as at 25 to provide an annular series of radially extending ribs. The ribs formed by the depressed portions 25 greatly increase the strength of the wheel 10.

An annular series of radially inwardly projecting protuberances 26 are provided in the shoulder flange portion 21 in proximity to the junction of this shoulder flange portion 21 with the web or nave portion 20.

The cover members 11 and 12 are formed of relatively thin metal and each has its outer surface provided with an ornamental finish such, for example, as having its surface highly polished, chromium plated, or enameled. I have found a very satisfactory form of material for the cover members 11 and 12 is a stainless steel having approximately 18% chromium and 8% nickel therein. By employing cover members of very thin strong metal stock, it will be observed that these cover members do not add materially to the unsprung weight of the wheel.

The cover member 11 is shaped to cover and conceal the web or nave portion 20 of the body part 14 of the wheel 10. This cover member 11 includes a principal portion 27 which overlies the web or nave portion 20 and is spaced therefrom, an inturned outer edge portion 28 and a plurality of inturned integral lips 29 extending from the inner edge 30 thereof. The lips 29 are provided with rectangular openings 31 which are slightly larger than the protuberances 26 of the wheel 10 and which thus permit the lips 29 to be sprung over these protuberances 26.

The cover member 12 is shown as being in the form of a hub cap or wheel disk and includes a central domed shaped portion 32 and an axially rearwardly extending fastening flange portion 33. The edge of the flange 33 is tightly rolled outwardly as at 34. This tight rolling of the rear edge of the flange 33 greatly stiffens this flange. When the flange is telescoped over the protuberances 26 the tightly rolled edge 34 is held in tight resilient engagement with the protuberances 26 thus holding the cover member 12 on the wheel by its own inherent resiliency.

It will be observed from an inspection of Figure 2 of the drawing that the bent radially outermost portion 35 of the cover member 12 is seated on the cover member 11.

The outer exposed surfaces of the cover members 11 and 12 may be provided with any suitable configuration which will enhance the appearance of the wheel assembly. As shown in the drawing, the cover member 11 is corrugated as at 36 while the domed shaped portion 32 of the cover member 12 is provided with a smooth outer surface.

To assemble the cover members 11 and 12 on the wheel 10, the cover member 11 is moved into engagement by bringing the lips 29 over the protuberances 26 and permitting the protuberances 26 to project through the openings 31 in the lips 29. The cover member 12 is thereafter sprung over the protuberances 26 until the tightly rolled edge 34 is clamped down behind the protuberances 26 in abutting engagement therewith. It will be noticed from inspection of the drawing that the cover member 12 may be readily and quickly removed from the wheel 10 without in any way disturbing the mounted engagement of the cover member 11 with the wheel 10. This is a highly desirable feature since it permits access to the wheel mounting post without removal of both cover members 11 and 12.

In Figure 3 of the drawing I have shown a modified form of the present invention wherein the cover member 11 is arranged to extend over part of the rim 13 as well as over the web or nave portion 20 of the wheel 10. More specifically the cover member 11 is provided with an outer portion 37 which extends radially outwardly and axially forwardly and which terminates in an inturned outer edge 38 which is seated on the intermediate base flange 17 of the rim 13. From an inspection of Figure 3 it will be observed that the cover member 11 in this form of the invention completely conceals the junction of the wheel body part 14 with the rim 13 and also harmonizes with the general configuration of the wheel by providing a continuous annularly indented portion 39 which is spaced from but in close proximity to the junction of the wheel body part 14 with the rim 13.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. The combination comprising a wheel having a generally axially extending radially inwardly facing shoulder portion, a plurality of circumferentially spaced protuberances on said shoulder, and a sheet metal member for disposition of said wheel having a plurality of generally axially extending lips each having an opening therein, said lips being shaped and arranged to be sprung over said protuberances with said protuberances projected through said openings, and a second sheet metal member having a rearwardly projecting flange arranged to be sprung over said protuberances to retain said second member on said wheel by its own inherent resiliency.

2. The combination comprising a wheel having a generally axially extending radially inwardly facing shoulder portion, a plurality of circumferentially spaced protuberances on said shoulder, and a sheet metal member for disposition on said wheel having rearwardly projecting lips corresponding in number to said protuberances and arranged to extend thereover, said lips being apertured for the reception and extension therethrough of said protuberances as said lips are sprung thereover.

3. The combination comprising a wheel having a generally axially extending radially inwardly facing shoulder portion, a plurality of circumferentially spaced protuberances on said shoulder, and a sheet metal member for disposition on said wheel having rearwardly projecting lips corresponding in number to said protuberances and arranged to extend thereover, said lips being apertured for the reception and extension therethrough of said protuberances as said lips are sprung thereover, and a second sheet metal member having a rearwardly projecting flange disposed radially inwardly of said lips and arranged to be sprung over said protuberances to retain said second member on said wheel by its own inherent resiliency.

4. The combination comprising a wheel including rim and body parts, said body part having a generally axially extending radially inwardly facing shoulder portion, a plurality of circumferentially spaced protuberances on said shoulder, and a sheet metal member for disposition on said wheel, the radial outer edge of said member being seated on said wheel in proximity to the junction of said body part and said rim, and the radial inner edge of said member being seated on said body part, said member having a plurality of rearwardly projecting integral lips extending from the radial inner edge thereof over said protuberances, each of said lips having an opening therein through which said protuberances project when said member is disposed in mounted engagement on said wheel.

5. The combination comprising a wheel including rim and body parts, said body part having a generally axially extending radially inwardly facing shoulder portion, a plurality of circumferentially spaced protuberances on said shoulder, and a sheet metal member for disposition on said wheel, the radial outer edge of said member being seated on said rim, and the radial inner edge of said member being seated on said body part, said member having a plurality of rearwardly projecting integral lips extending from the radial inner edge thereof over said protuberances, each of said lips having an opening therein through which said protuberances project when said member is disposed in mounted engagement on said wheel.

6. In a wheel structure, a wheel including rim and body parts, rigid protuberance means on said body part, an annular wheel cover member having its inner margin provided with rearwardly projecting means to fit over said protuberance means and being flexible to be snapped over and into retained cooperation with said protuberance means, said protuberance means comprising spaced protuberances extending substantially in a radial direction and said projecting means extending generally in an axial direction and having spaced apertures through which said protuberances extend after said projecting means has been snapped over and into retaining cooperation with said protuberances.

7. In a wheel structure, a wheel including rim and body parts, rigid protuberance means on said wheel, a first wheel cover member having rearwardly projecting means apertured to fit over said protuberance means and being flexible to be distorted and snapped over and into retained cooperation with said protuberance means, and an additional cover member fitted over said first member to conceal said protuberance means and having a continuous flexible rear flange snapped over said projecting means and the first cover member and into retaining cooperation with said protuberance means.

8. In a wheel structure, a wheel including rim and body parts, rigid protuberance means on said wheel, a first wheel cover member having rearwardly projecting means to fit over said protuberance means and being flexible to be distorted and snapped over and into retained cooperation with said protuberance means, and an additional cover member fitted over said first member to conceal said protuberance means and having a continuous flexible rear flange snapped over said projecting means and the first cover member and into retaining cooperation with said protuberance means, said protuberance means comprising spaced protuberances extending substantially in a radial direction and said projecting means extending rearwardly past said protuberances and having spaced apertures through which said protuberances extend after said projecting means has been snapped into retaining cooperation therewith.

GEORGE ALBERT LYON.